US011009176B2

(12) United States Patent
Shepherd et al.

(10) Patent No.: US 11,009,176 B2
(45) Date of Patent: May 18, 2021

(54) THERMAL INSULATION STRUCTURE

(71) Applicants: Advanced Insulation Limited, Gloucester (GB); Dow Silicones Corporation, Midland, MI (US)

(72) Inventors: Simon Harry Shepherd, Gloucester (GB); Laura Louise Jordan, Gloucester (GB); Brian Swanton, Midland, MI (US); Patrick Beyer, Wiesbaden (DE); Roman Vanecek, Wiesbaden (DE)

(73) Assignees: Advanced Insulation Limited, Gloucester (GB); Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/624,339

(22) PCT Filed: Jun. 19, 2018

(86) PCT No.: PCT/GB2018/051700
§ 371 (c)(1),
(2) Date: Dec. 19, 2019

(87) PCT Pub. No.: WO2018/234783
PCT Pub. Date: Dec. 27, 2018

(65) Prior Publication Data
US 2020/0378543 A1 Dec. 3, 2020

(30) Foreign Application Priority Data
Jun. 20, 2017 (GB) ...................... 1709852

(51) Int. Cl.
*F16L 59/02* (2006.01)
*B32B 15/08* (2006.01)
*B32B 27/20* (2006.01)
*B32B 27/28* (2006.01)
*C08L 83/04* (2006.01)
*E21B 36/00* (2006.01)

(52) U.S. Cl.
CPC ............ *F16L 59/029* (2013.01); *B32B 15/08* (2013.01); *B32B 27/20* (2013.01); *B32B 27/283* (2013.01); *C08L 83/04* (2013.01); *E21B 36/003* (2013.01); *F16L 59/028* (2013.01); *B32B 2264/101* (2013.01); *B32B 2264/107* (2013.01); *B32B 2264/1021* (2020.08); *B32B 2307/304* (2013.01)

(58) Field of Classification Search
CPC ............ F16L 59/029; B32B 2307/304; B32B 2307/3065; B32B 27/283; B32B 15/08; C08L 83/04; C08L 83/06; C08L 83/08; C08L 83/00; C08K 7/22; C08K 7/24; C08K 7/26; C08K 7/28
See application file for complete search history.

(56) References Cited

U.S. PATENT DOCUMENTS

| 4,433,069 | A | * | 2/1984 | Harper | .................... C08J 9/0085 521/103 |
| 4,738,988 | A | * | 4/1988 | Dietlein | .................... C08J 9/32 521/103 |
| 2002/0097966 | A1 | * | 7/2002 | Zelesnik | .................... F16L 9/19 385/100 |
| 2007/0134425 | A1 | * | 6/2007 | Morita | ................. C09D 183/04 427/387 |
| 2009/0221203 | A1 | * | 9/2009 | Nosker | .................... C09D 7/69 442/301 |

FOREIGN PATENT DOCUMENTS

GB 2503209 A 12/2013
WO 2018234783 A1 12/2018

OTHER PUBLICATIONS

"International Search Report and Written Opinion for PCT Patent Application No. PCT/GB2018/051700", dated Sep. 14, 2018, 9 Pages.

* cited by examiner

*Primary Examiner* — Monique R Jackson
(74) *Attorney, Agent, or Firm* — Medley, Behrens & Lewis, LLC

(57) ABSTRACT

A thermal insulation structure for a substrate for use subsea, and a method of providing a thermal insulating structure. The structure comprises: an inner layer and an outer layer. The inner layer is the reaction product of a first part and a second part, wherein the weight ratio of the first part to the second part is from about 15:1 to 1:1. The first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst. The second part comprises a mixture of organohydrogensiloxane having two Si—H bonds per molecule and organohydrogensiloxane having at least three Si—H bonds per molecule. The outer layer is the reaction product of a first part and a second part, wherein the weight ratio of the first part to the second part is from about 15:1 to 1:1. The first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst. The second part comprises organohydrogensiloxane having at least two Si—H bonds per molecule and alkenylated MQ silicone resin, wherein said M group comprises at least two Si-alkenyl bonds per molecule.

19 Claims, No Drawings

THERMAL INSULATION STRUCTURE

TECHNOLOGICAL FIELD

Examples of the disclosure relate to a thermal insulation structure, and particularly a thermal insulation structure for a substrate for use subsea.

BACKGROUND

The application of thermal insulation to subsea oil and gas equipment to maintain the temperature of the extracted fluids as they pass through portions of the equipment exposed to the cooling effects of sea water is known. Items of subsea equipment which benefit from thermal insulation include: wellheads and Xmas trees, spool pieces, manifolds, risers and pipe field joints.

Thermal insulation must have a low thermal conductivity and exhibit the required mechanical properties, such as flexibility. At high temperatures, for instance above 150 degrees centigrade, known thermal insulation can become brittle leading to a deterioration or loss of the required mechanical properties, such as flexibility.

There is a requirement therefore for thermal insulation which has a low thermal conductivity and exhibits the required mechanical properties, such as flexibility, even at high temperatures, for example, above 150 degrees centigrade.

All proportions in this specification are expressed as weight percentages.

BRIEF SUMMARY

According to various, but not necessarily all, examples of the disclosure there is provided a thermal insulation structure for a substrate for use subsea, the structure comprising: an inner layer and an outer layer; the inner layer being the reaction product of a first part and a second part, wherein the weight ratio of the first part to the second part is from about 15:1 to 1:1, the first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst, wherein the second part comprises a mixture of organohydrogensiloxane having two Si—H bonds per molecule and organohydrogensiloxane having at least three Si—H bonds per molecule; the outer layer being the reaction product of a first part and a second part, wherein the weight ratio of the first part to the second part is from about 15:1 to 1:1, the first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst, wherein the second part comprises organohydrogensiloxane having at least two Si—H bonds per molecule and alkenylated MQ silicone resin, having at least two Si-alkenyl bonds per molecule.

The weight ratio of the first part to the second part for the inner layer may be from about 10:1 to 1:1, or may be from about 5:1 to 1:1, or may be about 1:1.

The weight ratio of the first part to the second part for the outer layer may be from about 15:1 to 1:1 or may be about 15:1 to 5:1, or may be from about 13:1 to 8:1, or may be about 10:1.

The second part of the inner layer may comprise a mixture of an organohydrogensiloxane having a maximum of two Si—H bonds per molecule and an organohydrogensiloxane having at least three Si—H bonds per molecule. The organo groups may be any suitable organic group but is typically an alkyl group having from 1 to 6 carbon atoms, alternatively methyl or ethyl groups, alternatively methyl groups.

The second part for each of the inner and outer layers may comprise any of alkenyldialkyl terminated polydialkylsiloxane, alkenyldialkyl terminated polydialkylalkenylmethylsiloxane or mixtures thereof. The alkenyl groups may be any suitable alkenyl group but typically have from 2 to 6 carbon atoms, alternatively the alkenyl groups are vinyl and/or hexenyl groups but typically all alkenyl groups are vinyl groups.

The alkenyl group of the alkenylated MQ silicone resin may comprise 2 to 6 carbon atoms. The alkenylated MQ silicone resin may comprise vinylated MQ resin.

The silicon-bonded alkyl groups and/or organic groups as described herein can include substituted and unsubstituted alkyl groups of 1-6 carbon atoms that are otherwise free of ethylenic or acetylenic unsaturation. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as aminofunctional groups, amido-functional groups, and cyanofunctional groups; sulphur atoms; and sulphur atom containing groups such as mercapto groups. Typically when organohydrogensiloxanes having two silicon bonded hydrogen atoms per molecule are present they will be used in a mixture with organohydrogensiloxane having more than two silicon bonded hydrogen atoms per molecule.

A first primer may be provided between the inner layer and the substrate. A second primer may be provided between the inner and outer layers. The first and second primers may have different compositions.

The inner layer may comprise a syntactic medium. The syntactic medium may comprise microspheres. The microspheres may comprise ceramic microspheres. The inner layer may comprise about 2 to 6% by weight microspheres, and may comprise about 4% by weight microspheres.

The outer layer may comprise a syntactic medium. The syntactic medium may comprise microspheres. The microspheres may comprise glass microspheres. The microspheres may comprise borosilicate glass microspheres. The outer layer may comprise about 2 to 6% by weight microspheres, and may comprise about 4% by weight microspheres.

The inner layer may comprise filler. The outer layer may comprise filler. The filler may be reinforcing filler, non-reinforcing filler or a mixture thereof.

The inner layer may have a thickness of about 5 to 50 mm, and may have a thickness of about 20 mm. The outer layer may have a thickness of about 10 to 250 mm.

According to various, but not necessarily all, examples of the disclosure there is provided a substrate for use subsea comprising a thermal insulation structure according to any of the preceding eleven paragraphs.

The substrate may be metal. An anticorrosion coating may be provided on the substrate. The anticorrosion coating may be an epoxy phenolic coating.

According to various, but not necessarily all, examples of the disclosure there is provided a method of providing a thermal insulation structure for a substrate for use subsea, the method comprising: providing a structure comprising: an inner layer and an outer layer; the inner layer being the reaction product of first and second parts, wherein the weight ratio of the first part to the second part is from about 15:1 to 1:1, the first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst, wherein the second part comprises a mixture of organohydrogensiloxane having two Si—H bonds per molecule and organohydrogensiloxane having at least three Si—H bonds per molecule; the outer layer being the reaction product of first and second parts, wherein the weight ratio of the first part to the second part is from about 15:1 to 1:1, the first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst, wherein the second part comprises organohydrogensiloxane having at least two Si—H bonds per molecule and alkenylated MQ silicone resin having at least two Si-alkenyl bonds per molecule.

According to various, but not necessarily all, examples of the disclosure there may be provided examples as claimed in the appended claims.

DETAILED DESCRIPTION

Examples of the disclosure provide a thermal insulation structure, and particularly a thermal insulation structure for a substrate for use in subsea applications.

The substrate may be, for instance, subsea oil and gas equipment. The thermal insulation structure maintains the temperature of the extracted fluids as they pass through portions of the equipment exposed to the cooling effects of sea water. Items of subsea equipment which benefit from thermal insulation include: wellheads and Xmas trees, spool pieces, manifolds, risers and pipe field joints.

The thermal insulation structure comprises an inner layer and an outer layer.

The inner layer is the reaction product of a first part and a second part. In one example, the ratio of the first part to the second part is about 1:1. However, in other examples, the weight ratio of the first part to the second part may be in a range from about 15:1 to 1:1, from about 10:1 to 1:1, or from about 5:1 to 1:1. The first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst. As hereinbefore described the alkenyl groups preferably have from 2 to 6 carbon atoms and typically are vinyl groups.

The second part comprises a mixture of organohydrogensiloxane having two Si—H bonds per molecule, which in some examples is a maximum of two Si—H bonds per molecule, and organohydrogensiloxane having at least three Si—H bonds per molecule. As hereinbefore described the organo groups are alkyl groups such as methyl groups and ethyl groups, alternatively methyl groups.

The outer layer is the reaction product of a first part and a second part. In one example, the ratio of the first part to the second part is about 10:1. However, in other examples, the weight ratio of the first part to the second part may be in a range from about 15:1 to 1:1, from about 15:1 to 5:1, or from about 13:1 to 8:1.

The first part comprises any of alkenyldialkyl terminated polydialkylsiloxane, alkenyldialkyl terminated polydialkylalkenylmethylsiloxane or mixtures thereof, which will individually or collectively have a viscosity of from 250 to 10000 mPa·s at 25° C., and a hydrosilylation catalyst. As hereinbefore described the alkenyl groups preferably have from 2 to 6 carbon atoms and typically are vinyl groups.

The second part comprises organohydrogensiloxane having at least two Si—H bonds per molecule and alkenylated MQ silicone resin, having at least two Si-alkenyl bonds per molecule. In some examples, the alkenyl group of the alkenylated MQ silicone resin comprises 2 to 6 carbon atom. The alkenylated MQ silicone resin may comprise vinylated MQ resin.

In some examples, the second part for each of the inner and outer layers also comprises any of alkenyldialkyl terminated polydialkylsiloxane, for example vinyldialkyl terminated polydialkylsiloxane, alkenyldialkyl terminated polydialkylalkenylmethylsiloxane, for example vinyldialkyl terminated polydialkylalkenylmethylsiloxane or mixtures thereof.

With respect to MQ silicone resins defined herein, M units typically have the formula $R^1R^2R^3SiO_{1/2}$, each of $R^1$, $R^2$ and $R^3$ an alkyl group or an alkenyl group. Each alkyl group generally has 1 to 6 carbon atoms, alternatively is a methyl group or an ethyl group, alternatively a methyl group. Each alkenyl group has 2 to 6 carbon atom and is generally selected from a vinyl group or a hexenyl group. $R^1$, $R^2$ and $R^3$ will either be all alkyl groups or a mixture of alkyl and alkenyl groups. An alkenylated M group will generally comprise two alkyl groups, e.g. methyl and one alkenyl group, e.g. vinyl. Q units typically have the formula $SiO_{4/2}$.

Advantageously, examples of the disclosure have a low thermal conductivity and exhibit the required mechanical properties, such as flexibility, even at high temperatures, for instance above 150 degrees centigrade. At such high temperatures, the inner layer remains relatively soft and flexible whereas the outer layer may become brittle. Accordingly, the inner layer provides mechanical damping to absorb stress/strain between the substrate and the outer layer, whereas the stiffer outer layer protects the inner layer from external conditions, such as seawater and hydrostatic pressure.

In some examples, a first primer is provided between the inner layer and the structure and a second primer is provided between the inner and outer layers. The first and second primers may have different compositions. In other examples, primer may be provided only between the inner layer and the structure or only between the inner and outer layers.

In some examples, the inner layer comprises a syntactic medium. In other examples, the inner layer does not comprise a syntactic medium. The syntactic medium may comprise microspheres. In such examples, the inner layer comprises about 2 to 6% by weight microspheres, and may comprise about 4% by weight microspheres. The microspheres may be ceramic microspheres.

In some examples, the outer layer also comprises a syntactic medium. The syntactic medium may comprise microspheres. In such examples, the inner layer comprises about 2 to 6% by weight microspheres, and may comprise about 4% by weight microspheres. The microspheres in the outer layer may be glass microspheres, and particularly may be borosilicate glass microspheres. In other examples, for instance, structures which are for use on substrates in deep water, for example 4000 m, which would need to withstand high pressures, the outer layer may not comprise a syntactic medium.

In some examples the inner and outer layers comprise filler. In other examples, only the inner layer or the outer layer may comprise filler. The filler may be reinforcing filler, non-reinforcing filler or a mixture thereof. The filler may be glass filler.

In examples of the disclosure, the inner layer has a thickness of about 5 to 50 mm, and may have a thickness of about 20 mm. The outer layer has a thickness of about 10 to 250 mm.

Examples of the disclosure also provide a substrate for use subsea comprising a thermal insulation structure as described above. In some examples, the substrate is metal and may be, for instance, subsea oil and gas equipment such as wellheads and Xmas trees, spool pieces, manifolds, risers and pipe field joints.

In some examples, an anticorrosion coating is provided on the substrate, and the anticorrosion coating may be an epoxy phenolic coating. The anticorrosion coating may have a thickness of about 4 to 600 microns. In examples where a primer is provided between the inner layer and the structure, the primer is applied to the anticorrosion coating. In other example, the inner layer may be applied directly to the anticorrosion coating.

Examples of the disclosure also provide a method of providing a thermal insulation structure for a substrate for use subsea, the method comprising providing a thermal insulation structure as described above.

In some examples, the method includes the steps of forming the inner and outer layers separately by injection moulding. The inner and outer layers may be applied to the substrate by injection moulding. In such examples, the respective first and second parts of the inner and outer layers would be mixed en route to the mould.

The respective mixtures of the first and second parts of the inner and outer layers may be ambient cured or may be cured at elevated temperatures, as required.

In other examples, the inner layer may be hand applied in an uncured state, and particularly to substrates with a complex profile.

The thermal insulation structure may be constructed around or on a substrate by the sequential application of the inner and outer layers to the substrate. In some examples, a first primer may be applied to the substrate, or to the anticorrosion coating of the substrate. The first primer would then be allowed to cure. The inner layer would then be applied to the cured first primer. A second primer would then be applied to the inner layer. The second primer would then be allowed to cure. The outer layer would then be applied to the cured second primer.

An Example Composition of the First and Second Parts of the Inner Layer

First Part
1) A vinyldimethyl terminated polydimethylsiloxane or vinyldimethyl terminated polydimethylvinylmethylsiloxane having a viscosity of from 250 to 10000 mPa·s at 25° C. in an amount of from 50 to 90% by weight of the composition. In other examples, the viscosity may be from 250 to 1000 mPa·s at 25° C.
2) Suitable hydrosilylation catalysts (C) comprise platinum group metals (sometimes referred to as platinum metals) i.e. platinum, ruthenium, rhodium, palladium, osmium and iridium or complexes or compounds of a platinum group metal. Preferred catalysts are platinum compounds or complexes including chloroplatinic acid, platinum acetylacetonate, complexes of platinous halides with unsaturated compounds, for example, ethylene, propylene, organovinylsiloxanes and styrene, hexamethyldiplatinum, $PtCl_2 \cdot PtCl_3$ and $Pt(CN)_3$. One preferred catalyst (C) is Karstedt's catalyst, a coordination complex of platinum and divinyltetramethyldisiloxane produced by reaction of chloroplatinic acid and divinyltetramethyldisiloxane. Alternatively the catalyst may be a rhodium complex, for example, $RhCl_3(Bu_2S)_3$. The hydrosilylation catalyst (C) may for example be present in the composition at from 10 to 200 parts per million (ppm) by weight of a platinum group metal based on the total weight of the organopolysiloxane (A), such as from 30 to 150 ppm or from 50 or 80 ppm up to 120 ppm by weight of a platinum group metal.

The remainder is made up of:
3) One or more finely divided, reinforcing fillers such as high surface area fumed and precipitated silicas and/or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Silica fillers are preferred. Generally the filler is treated for example with a fatty acid or a fatty acid ester such as a stearate, or with organosilanes, organosiloxanes, or organosilazanes e.g. hexaalkyl disilazane or short chain siloxane diols to render the filler(s) hydrophobic and therefore easier to handle and obtain a homogeneous mixture with the other sealant components The surface treatment of the fillers makes the filler easily wetted by the silicone polymer.
4) Optionally a syntactic medium such as ceramic microspheres in the range of 2-6%.

Second Part
1) A vinyldimethyl terminated polydimethylsiloxane or vinyldimethyl terminated polydimethylvinylmethylsiloxane having a viscosity of from 250 to 10000 mPa·s at 25° C. in an amount of from 50 to 70% by weight of the composition. In other examples, the viscosity may be from 250 to 1000 mPa·s at 25° C.
2) A mixture of:
  (i) linear, branched and/or cyclic organohydrogensiloxanes each having two silicon bonded hydrogen atoms per molecule and
  (ii) linear, branched and/or cyclic organohydrogensiloxanes each having three or more silicon bonded hydrogen atoms per molecule.
  The organohydrogensiloxanes (i) and (ii) can contain, for example, from about 4-100 silicon atoms per molecule, and have a viscosity of from 5 mPa·s at 25° C. to about 10 mPa·s at 25° C. The organohydrogensiloxanes (i) and (ii) may have terminal Si—H groups and/or pendent Si—H groups in the molecule. The silicon-bonded organic groups present in the organohydrogensiloxane can include substituted and unsubstituted alkyl groups of 1-4 carbon atoms that are otherwise free of ethylenic or acetylenic unsaturation. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups. In total said organohydrogensiloxanes (i) and (ii) are generally present in an amount of from 2 to 20% by weight, alternatively 2 to 15% by weight of the total composition.

The remainder is substantially made up of:

3) One or more finely divided, reinforcing fillers such as high surface area fumed and precipitated silicas and/or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite and/or silicone resins such as vinylated MQ resins wherein Q units typically have the formula $SiO_{4/2}$ and M units typically having the formula $R^1R^2R^3SiO_{1/2}$ as hereinbefore described which M groups contain at least one alkenyl group. Silica fillers are preferred. Generally the filler is treated for example with a fatty acid or a fatty acid ester such as a stearate, or with organosilanes, organosiloxanes, or organosilazanes e.g. hexaalkyl disilazane or short chain siloxane diols to render the filler(s) hydrophobic and therefore easier to handle and obtain a homogeneous mixture with the other sealant components The surface treatment of the fillers makes the filler easily wetted by the silicone polymer.

4) Optionally one or more cure inhibitor(s) may be introduced, which may be any suitable hydrosilylation inhibitor, these may be selected from, for example, acetylenic compounds, e.g. acetylenic alcohols, ethylenically unsaturated isocyanates, acetylenically unsaturated silanes and unsaturated dicarboxylic acid diesters or a maleate compound such as a bismaleate or a diallylmaleate, or a mixture thereof.

5) Optionally a syntactic medium such as ceramic microspheres in the range of 2-6%.

In one example, the first part and the second part are mixed together immediately prior to use in a weight ratio of about 1:1. The first part is a cure package part and the second part is a base part.

| Ingredient | Example 1 | Example 2 |
|---|---|---|
| First Part | | |
| vinyldimethyl terminated polydimethylsiloxane | 35.71 | 37.5 |
| Karstedt's catalyst | 0.005 | 0.005 |
| Fumed silica | 11.9 | 12.49 |
| Ceramic microspheres | 2.38 | 0 |
| Second Part | | |
| vinyldimethyl terminated polydimethylsiloxane | 30.95 | 32.5 |
| Organohydrogensiloxanes mixture | 9.52 | 10 |
| Fumed silica | 7.15 | 7.5 |
| Inhibitor | 0.005 | 0.005 |
| Ceramic microspheres | 2.38 | 0 |

An Example Composition of the First and Second Parts of the Outer Layer

First Part

1) One or more vinyldimethyl terminated polydimethylsiloxane or vinyldimethyl terminated polydimethylvinylmethylsiloxane having a viscosity of from 250 to 10000 mPa·s at 25° C. in an amount of from 50 to 90% by weight of the composition. In other examples, the viscosity may be from 250 to 1000 mPa·s at 25° C.

2) Suitable hydrosilylation catalysts (C) comprise platinum group metals (sometimes referred to as platinum metals) i.e. platinum, ruthenium, rhodium, palladium, osmium and iridium or complexes or compounds of a platinum group metal. Preferred catalysts are platinum compounds or complexes including chloroplatinic acid, platinum acetylacetonate, complexes of platinous halides with unsaturated compounds, for example, ethylene, propylene, organovinylsiloxanes and styrene, hexamethyldiplatinum, $PtCl_2.PtCl_3$ and $Pt(CN)_3$. One preferred catalyst (C) is Karstedt's catalyst, a coordination complex of platinum and divinyltetramethyldisiloxane produced by reaction of chloroplatinic acid and divinyltetramethyldisiloxane. Alternatively the catalyst may be a rhodium complex, for example, $RhCl_3(Bu_2S)_3$. The hydrosilylation catalyst (C) may for example be present in the composition at from 10 to 200 parts per million (ppm) by weight of a platinum group metal based on the total weight of the organopolysiloxane (A), such as from 30 to 150 ppm or from 50 or 80 ppm up to 120 ppm by weight of a platinum group metal.

3) One or more finely divided, reinforcing fillers such as high surface area fumed and precipitated silicas and/or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite and/or silicone resins such as vinylated MQ resins wherein Q units typically have the formula $SiO_{4/2}$ and M units typically having the formula $R^1R^2R^3SiO_{1/2}$ as hereinbefore described, each of which M groups contain at least one alkenyl group. Silica fillers and/or MQ resins as described above are preferred. Generally the silica fillers are treated for example with a fatty acid or a fatty acid ester such as a stearate, or with organosilanes, organosiloxanes, or organosilazanes e.g. hexaalkyl disilazane or short chain siloxane diols to render the filler(s) hydrophobic and therefore easier to handle and obtain a homogeneous mixture with the other sealant components The surface treatment of the fillers makes the filler easily wetted by the silicone polymer.

4) Optionally a syntactic medium such as microspheres in the range of 2-6%.

Second Part

1) One or more vinyldimethyl terminated polydimethylsiloxane or vinyldimethyl terminated polydimethylvinylmethylsiloxane having a viscosity of from 250 to 10000 mPa·s at 25° C. in an amount of from 50 to 90% by weight of the composition. In other examples, the viscosity may be from 250 to 1000 mPa·s at 25° C.

2) One or more linear and/or cyclic methylhydrogensiloxanes each of which having two or more silicon bonded hydrogen atoms per molecule and/or one or more MQ resins where M and Q are as defined above but containing at least 2 Si—H bonds per molecule. The methylhydrogensiloxane can contain, for example, from about 4-100 silicon atoms per molecule, and have a viscosity of from 5 mPa·s 25° C. to about 10 Pa·s at 25° C. The one or more linear and/or cyclic methylhydrogensiloxanes may have terminal Si—H groups and/or pendent Si—H groups in the molecule.

Said organohydrogensiloxanes are generally present in an amount of from 25 to 50% by weight, alternatively 30 to 50% by weight of the total composition.

The remainder is made up of:

3) One or more vinylated MQ resins wherein Q units typically have the formula $SiO_{4/2}$ and M units typically having the formula $R^1R^2R^3SiO_{1/2}$ in an amount of from 10 to 30 weight % based on the total composition.

Optionally a pigment may be added.

In one example, the first part and the second part are mixed together immediately prior to use in a weight ratio of about 10:1 first part to second part. A UV tracer may be added. The first part is a base part and the second part is a cure package part.

| Ingredient | Example 1 | Example 2 |
|---|---|---|
| First Part | | |
| vinyldimethyl terminated polydimethylvinylmethylsiloxane | 68.18 | 71.77 |
| Karstedt's catalyst | 0.009 | 0.01 |
| Fumed Silica | 18.17 | 19.129 |
| Glass Microspheres | 4.55 | 0 |
| Second part | | |
| vinyldimethyl terminated polydimethylvinylmethylsiloxane | 5.45 | 5.45 |
| cyclic methylhydrogensiloxane | 2.73 | 2.73 |
| vinylated MQ resin | 0.91 | 0.91 |
| Pigment | 0.001 | 0.001 |

An Example Composition of a First Primer Provided Between the Inner Layer and the Structure.

a) Suitable organic solvent b) $R^4{}_nSi—(OR^7)_{4-n}$ with n being 1 or 2

$R^4$ is an unsaturated silicon-bonded organic group such as hydrocarbyl groups which are alkenyl groups (for example vinyl and allyl) and alkynyl groups.

$R^7$ is an alkoxy group having from 1 to 6 carbon atoms c) $R^5{}_pSi—(OR^6)_{4-p}$ where p may be 0, 1 or 2 preferably p is 0 or 1

$R^5$ may be a non-hydrolysable silicon-bonded organic group such as hydrocarbyl groups which are optionally substituted by halogen such as fluorine and chlorine. Examples include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

$R^6$ is an alkoxy group having from 1 to 6 carbon atoms (b) and (c) are different d) A Titanate of the general formula $Ti[OR^8]_4$ where each $R^8$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^8$ include but are not restricted to methyl, ethyl, propyl, isopropyl, butyl, tertiary butyl and a branched secondary alkyl group such as 2,4-dimethyl-3-pentyl. Preferably, when each $R^8$ is the same, $R^8$ is an isopropyl, branched secondary alkyl group or a tertiary alkyl group, in particular, tertiary butyl.

An Example Composition of a Second Primer Provided Between the Inner and Outer Layers a) A linear polydialkylsiloxane having from 3 to 15 silicon atoms, alternatively 3 to 10 silicon atoms. Each alkyl group may be the same or different and may comprise from 1 to 6 carbon atoms.

b) $R_nSi—(OR^9)_{4-n}$ where n may be 0, 1 or 2 preferably n is 0 or 1.

R may be a non-hydrolysable silicon-bonded organic group such as hydrocarbyl groups. Examples include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Each $R^9$ is the same or different and is an alkoxy group having from 1 to 6 carbon atoms c) A Titanate of the general formula $Ti[OR^2]_4$ where each $R^2$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^2$ include but are not restricted to methyl, ethyl, propyl, isopropyl, butyl, tertiary butyl and a branched secondary alkyl group such as 2,4-dimethyl-3-pentyl. Preferably, when each $R^2$ is the same, $R^2$ is an isopropyl, branched secondary alkyl group or a tertiary alkyl group, in particular, tertiary butyl.

d) $R_nSi—(OR^3)_{4-n}$ may be 0, 1 or 2 preferably n is 0 or 1.

R may be a non-hydrolysable silicon-bonded organic group such as hydrocarbyl groups Examples include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Each $R^3$ is the same or different and is an alkoxy group having from 1 to 6 carbon atoms or an alkoxyalkylene group in which the alkoxy group has from 1 to 6 carbon atoms and the alkylene chain has from 1 to 6 carbon atoms.

(b) and (d) are different.

In the present application, viscosity was measured at 25° C. using a Brookfield viscometer with an appropriate spindle chosen according to the viscosity required.

There is thus described a thermal insulation substrate with a number of advantages as discussed above.

Although embodiments of the present invention have been described in the preceding paragraphs with reference to various examples, it should be appreciated that modifications to the examples given can be made without departing from the scope of the invention as claimed. For example, in examples in which the inner layer and/or outer layer comprise a syntactic medium, microspheres of any material and/or structure may be used.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A thermal insulation structure for a substrate for use subsea, the thermal insulation structure comprising:
   an inner layer and an outer layer;
   the inner layer being a reaction product of a first part and a second part, wherein a weight ratio of the first part to the second part is from about 15:1 to 1:1, the first part comprises any of alkenyldialkyl terminated polydialkylsiloxane, alkenyldialkyl terminated polydialkylalkenylmethylsiloxane or mixtures thereof, which individually or collectively have a viscosity of from 250 to 10000 mPa·s at 25° C., and a hydrosilylation catalyst, wherein the second part comprises a mixture of organohydrogensiloxane having two Si—H bonds per molecule and organohydrogensiloxane having at least three Si—H bonds per molecule;
   the outer layer being a reaction product of a third part and a fourth part, wherein a weight ratio of the third part to the fourth part is from about 15:1 to 1:1, the third part comprises any of alkenyldialkyl terminated polydialkylsiloxane, alkenyldialkyl terminated polydialkylalkenylmethylsiloxane or mixtures thereof, which individually or collectively have a viscosity of from 250 to 10000 mPa·s at 25° C., and a hydrosilylation catalyst, wherein the fourth part comprises organohydrogensiloxane having at least two Si—H bonds per molecule and alkenylated MQ silicone resin, wherein said M group comprises at least two Si-alkenyl bonds per molecule;
   wherein a first primer is provided between the inner layer and the substrate, wherein a second primer is provided between the inner layer and the outer layer.

2. The thermal insulation structure according to claim 1, wherein the weight ratio of the first part to the second part for the inner layer is about 1:1.

3. The thermal insulation structure according to claim 1, wherein the weight ratio of the third part to the fourth part for the outer layer is about 10:1.

4. The thermal insulation structure according to claim 1, wherein the second part of the inner layer comprises a mixture of organohydrogensiloxane having a maximum of two Si—H bonds per molecule and organohydrogensiloxane having at least three Si—H bonds per molecule.

5. The thermal insulation structure according to claim 1, wherein the second part for the inner layer and the fourth part for the outer layer comprise any of vinyldialkyl terminated polydialkylsiloxane, vinyldialkyl terminated polydialkylalkenylmethylsiloxane or mixtures thereof.

6. The thermal insulation structure according to claim 1, wherein the alkenyl group of the alkenylated MQ silicone resin comprises 2 to 6 carbon atom.

7. The thermal insulation structure according to claim 1, wherein the alkenylated MQ silicone resin comprises vinylated MQ resin.

8. The thermal insulation structure according to claim 1, wherein the inner layer comprises a syntactic medium.

9. The thermal insulation structure according to claim 8, wherein the syntactic medium comprises microspheres.

10. The thermal insulation structure according to claim 1, wherein the inner layer comprises about 2 to 6% by weight microspheres.

11. The thermal insulation structure according to claim 1, wherein the outer layer comprises a syntactic medium.

12. The thermal insulation structure according to claim 11, wherein the syntactic medium comprises microspheres.

13. The thermal insulation structure according to claim 1, wherein the outer layer comprises about 2 to 6% by weight microspheres.

14. The thermal insulation structure according to claim 1, wherein the inner layer and the outer layer comprise filler.

15. The thermal insulation structure according to claim 1, wherein the inner layer has a thickness of about 5 to 50 mm.

16. The thermal insulation structure according to claim 1, wherein the outer layer has a thickness of about 10 to 250 mm.

17. A substrate for use subsea comprising the thermal insulation structure according to claim 1.

18. The substrate according to claim 17, wherein the substrate is metal.

19. A method of providing a thermal insulation structure for a substrate for use subsea, the method comprising:
providing the substrate; and
applying the thermal insulation structure to the substrate, the thermal insulation structure comprising:
an inner layer and an outer layer;
the inner layer being a reaction product of a first part and a second part, wherein a weight ratio of the first part to the second part is from about 15:1 to 1:1, the first part comprises any of alkenyldialkyl terminated polydialkylsiloxane, alkenyldialkyl terminated polydialkylalkenylmethylsiloxane or mixtures thereof, which individually or collectively have a viscosity of from 250 to 10000 mPa·s at 25° C., and a hydrosilylation catalyst, wherein the second part comprises a mixture of organohydrogensiloxane having two Si—H bonds per molecule and organohydrogensiloxane having at least three Si—H bonds per molecule;
the outer layer being a reaction product of a third part and a fourth part, wherein a weight ratio of the third part to the fourth part is from about 15:1 to 1:1, the third part comprises any of alkenyldialkyl terminated polydialkylsiloxane, alkenyldialkyl terminated polydialkylalkenylmethylsiloxane or mixtures thereof, which individually or collectively have a viscosity of from 250 to 10000 mPa·s at 25° C., and a hydrosilylation catalyst, wherein the fourth part comprises organohydrogensiloxane having at least two Si—H bonds per molecule and alkenylated MQ silicone resin, wherein said M group comprises at least two Si-alkenyl bonds per molecule;
wherein a first primer is provided between the inner layer and the substrate, wherein a second primer is provided between the inner layer and the outer layer.

* * * * *